Figure 1:
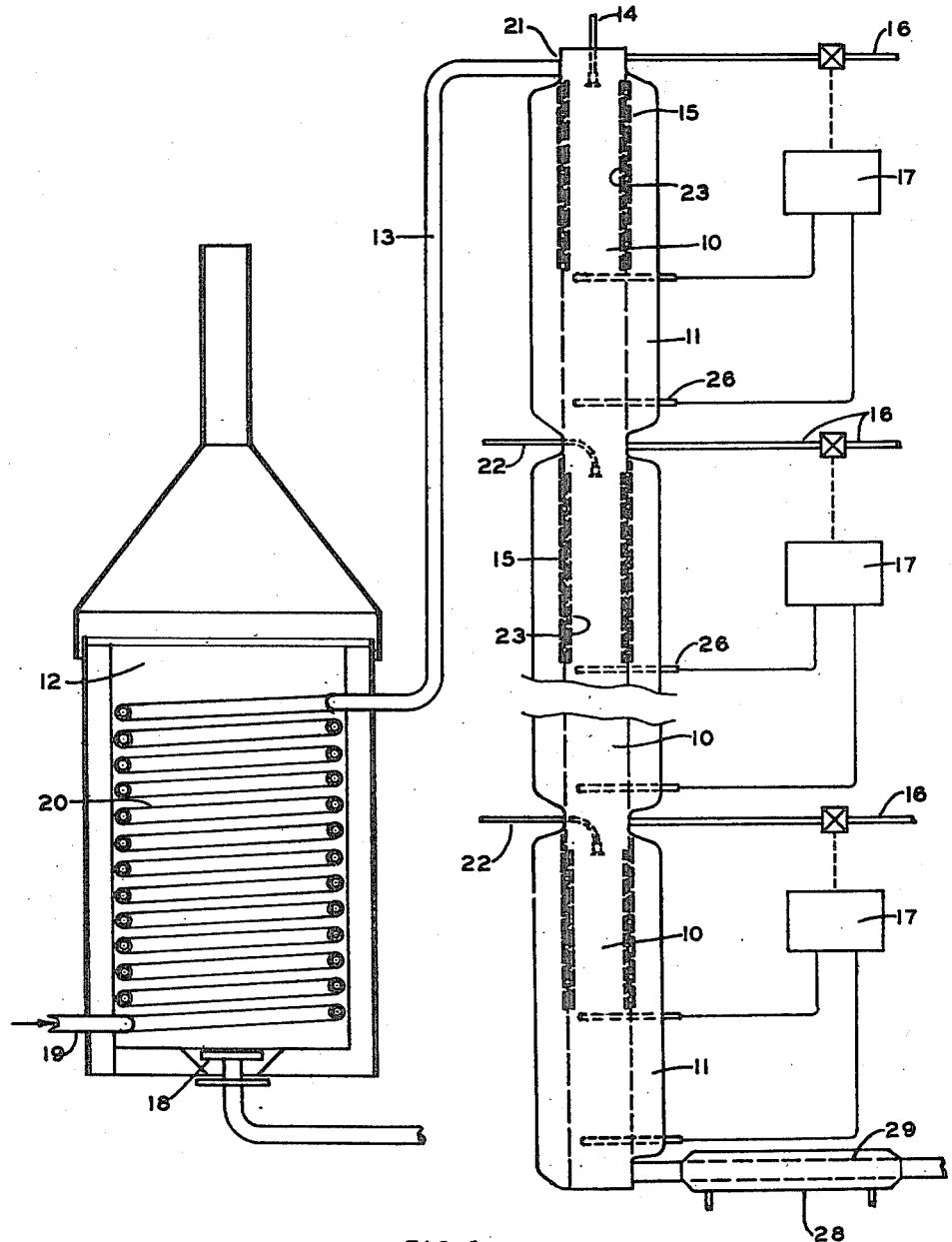

April 1, 1947.　　L. A. STENGEL ET AL　　2,418,241
PROCESS FOR VAPOR PHASE NITRATION OF ALKANES
Filed July 22, 1944　　2 Sheets-Sheet 2
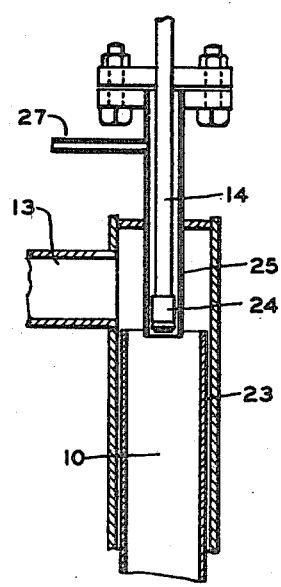
FIG. II.
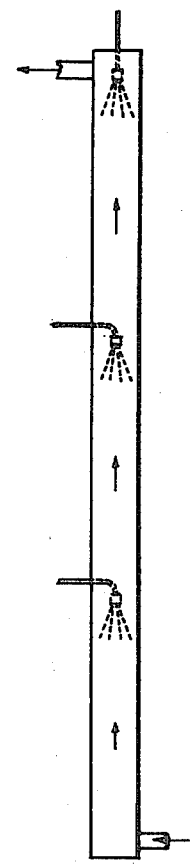
FIG. III.
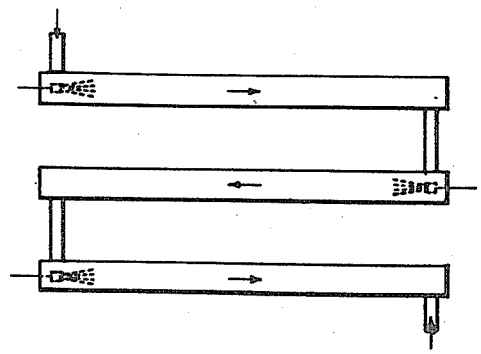
FIG. IV.
INVENTORS
BY
ATTORNEY Patented Apr. 1, 1947

2,418,241

UNITED STATES PATENT OFFICE 2,418,241

PROCESS FOR VAPOR PHASE NITRATION OF ALKANES

Leonard A. Stengel and Richard S. Egly, Terre Haute, Ind., assignors to Commercial Solvents Corporation, Terre Haute, Ind., a corporation of Maryland Application July 22, 1944, Serial No. 546,186

13 Claims. (Cl. 260—644)

This invention relates to the vapor phase nitration of alkanes, and more particularly to a method and apparatus for improving the efficiency of the process.

In carrying out vapor phase nitration of alkanes in the past, it has been the practice to separately vaporize the reactants, that is, the alkane and nitric acid, and to mix the vapors in a mixing chamber, thereafter to pass the combined vapors to a reaction chamber, and there to supply heat sufficient to bring the mixture to the reaction temperature, thereby causing the components to react to produce the desired nitroalkanes.

This prior practice was subject to a number of disadvantages. Not only is the nitration reaction an exothermic one, but it is a reaction which proceeds favorably only within a relatively narrow temperature range to give optimum yields of nitroalkanes. Thus, although nitration will occur to some extent within a relatively wide temperature range between approximately 360° C. and 480° C., it is only within the relatively much narrower range of about 390° C. and 440° C. that optimum nitroalkane yields are obtained. Thus, it is necessary, after the initiation of the nitration reaction, to remove the heat of reaction rapidly enough and to such an extent that the favorable reaction temperature range is not exceeded and yet not to remove so much heat that the mixture is cooled below its favorable reaction temperatures. This thermal control was formerly accomplished by immersing the reaction chamber in a heat absorbing jacket or bath such as a salt bath to absorb and convey away the excess heat of reaction. Such an operation was not only wasteful of heat and heat transfer, but due to the extreme rapidity of the reaction it was often impossible to remove the generated heat rapidly enough to prevent high temperatures from being reached, with resulting lowering of nitroalkane yields.

Another disadvantage of the prior art practice was the low mole ratios of alkane to nitric acid that necessarily resulted from the prior practice of mixing the vapors before passing them to the reaction chamber. The higher the mole ratio of alkane to nitric acid, up to perhaps 40 to 1, the higher the yield of nitroalkane. But high mole ratios were uneconomic to maintain in the prior art system, because of the excessive amounts of unreacted alkanes which had to be recovered from the exit gases. In the prior art practice, about the highest mole ratios which could be used, and still maintain an economic process with respect to recovery of unreacted alkanes and the like, was around 6 to 1.

We have now found that the disadvantages of the prior art can be overcome by our process in which the reactants are mixed, and the nitric acid reactant is vaporized, and the reaction takes place, all in a single combined vaporization-reaction chamber, and in which the temperature of the reaction is readily maintained within the relatively narrow range favorable for the production of high yields of nitroalkanes and high effective mole ratios of alkane to nitric acid conducive to high yields are utilized while still maintaining an economic process with respect to the recovery of unreacted alkanes and the like.

In practicing our invention, we preheat only the alkane reactant with which is then mixed successive limited portions of liquid nitric acid of predetermined concentration, such that the heat of the ensuing reaction is utilized to vaporize the nitric acid, and is thus dissipated and largely controlled within the reaction system to maintain the reaction temperature within the narrow optimum range described. In other words sufficient water is present in the nitric acid to raise its heat of vaporization under the conditions of the reaction to the point at which this heat substantially balances the heat of reaction of the acid with the alkane. The successive small additions of acid not only contribute, as described hereinafter, to the control of reaction temperature but bring about a condition in which the actual mole ratio of alkane to nitric acid at any stage of the process is high, while the overall ratio of total alkane to total nitric acid passing through the system is within the range of mole ratios of the prior art practice found to be economic with respect to alkane recovery. Our invention relates particularly to the nitration of the lower alkanes such as methane, ethane, propane, butane, pentane, hexane, heptane, octane, and the like.

In the drawings, Figure I is a schematic representation of the apparatus of our invention. Figure II is a detail showing the alkane inlet and a suitable nozzle for atomizing the liquid nitric acid into the stream of preheated alkane vapor. Figure III illustrates a modification in which the alkane flows counter-current to the direction of injection of the nitric acid and in which the alkane is shown as introduced at the bottom of a vertical reactor rather than at the top as in Figure I. Figure IV illustrates a modification of a multiple unit vaporizer-reactor in which the individual units are horizontally disposed. Like characters denote like structures wherever they occur throughout the several figures.

The apparatus of our invention comprises a reaction chamber or chambers 10, desirably insulated by jackets 11, the chambers being arranged either as several separate connecting units as in Figures I and IV or as a single unit utilizable in sections as in Figure III. A preheater 12 for heating the alkane reactant comprises a heating element 18, conventionally illustrated as a gas burner, an inlet 19 for the cold alkane, a heat exchanger 20, illustrated as a coil of pipe. A gas conveyor 13 leads to alkane inlet 21 of reaction chamber 10. Reaction chamber 10 is further provided with a primary inlet 14 for the first injection of liquid nitric acid disposed in the path of the incoming gaseous reactant and slightly beyond the hot gas inlet. Other supplementary liquid reactant inlets 22 are disposed at intervals through the extent of the reaction chamber. Heaters 15 shown schematically as simple strip heaters are disposed at intervals in the reaction chamber and cooling means 16 are provided and are shown as inlets for introducing cold inert gases or liquids to the reaction chamber. A temperature recorder and controller 17 is also provided, connected to thermocouples 26. If the reactants are of corrosive nature a protective, corrosion resistant lining 23 will be provided within reaction chamber 10. Beyond the reaction chamber or chambers, a cooling chamber 28 is positioned, through which the reacted vapors are withdrawn through outlet conduit 29 to subsequent recovery.

In operation, the alkane, either gaseous or liquid, enters preheater 12 through inlet 19 and passes through heat exchanger 20 which is heated by heating element 18. The hot gaseous alkane, heated to a suitable temperature within the favorable reaction temperature range, passes out of the preheater and is led through conveyor 13 to inlet 21 of reaction chamber 10. The reaction chamber may be a single unit with a plurality of inlets for the nitric acid or may comprise a plurality of units as shown, for greater flexibility in controlling the reaction. The liquid nitric acid is introduced in atomized form into the reaction chamber at liquid inlet 14 slightly beyond the vapor inlet, and is vaporized and raised to the reaction temperature by the hot gases, whereupon the vaporized liquid immediately reacts with the hot gaseous alkane generating heat which serves to vaporize additional nitric acid. Additional nitric acid is introduced at predetermined successive intervals spaced along the extent of the reaction chamber or into the successive connecting chambers in the path of the progressing stream of reaction vapors. The reacting vapors are forced by a positive pressure through the reaction chamber and continue to react as they proceed. The quantity of liquid nitric acid added at each stage is regulated to absorb the heat of reaction as it is produced and the addition of cold liquid is limited at any one stage so as to be insufficient to cool the reacting gases below the lower limit of the favorable temperature range of reaction. Thus the gases, initially cooled somewhat at the liquid inlet, are again raised in temperature by the exothermic reaction to the upper limit of the favorable reaction temperature. When such a point is reached, additional liquid reactant is added as at 22, and the vaporization, reaction and absorption of heat is repeated. This stepwise addition of liquid reactant may be repeated until the desired portion of the gaseous reactant originally introduced is utilized.

The rate of flow of alkane is regulated relative to the rate of addition of nitric acid such that the effective mole ratios of alkane to nitric acid are in excess of 6 to 1 and preferably considerably higher, preferably between about 10 to 1 and 40 to 1. Relatively somewhat higher mole ratios should be used in the case of methane and ethane than with the other lower alkanes because of the lower specific heats of these two alkane members. For the lower alkanes other than ethane and methane, a mole ratio between about 20 to 1 and 30 to 1 is generally to be preferred while with the lower members the optimum effective mole ratio is somewhat higher.

The number of additions of acid will in general determine the overall mole ratio of the system, that is, the mole ratio of the quantity of alkane with respect to the total quantity of nitric acid introduced in all the several reaction chambers or at the successive intervals in a single reaction chamber. From the point of view of recovery of unreacted alkanes, it is desirable to operate at as low as possible overall ratio of alkane to nitric acid, and therefore, to resort to as many successive additions of nitric acid as possible. However, the number of successive additions is limited by the fact that as more alkane reacts to form nitroalkane, the larger the proportion of nitroalkane which comes in contact with fresh nitric acid and when this concentration reaches a high enough point, reaction and decomposition of the nitroalkane begins to take place. We have found that the number of additions should be limited so as to maintain an overall ratio of alkane to nitric acid of not more than about 6 to 1, but preferably not less than about 3 to 1 as the presence of about this excess of alkane is necessary to foster efficient progress of the reaction. After reaction, the gases pass through a cooling chamber and are withdrawn to the recovery system.

The quantity of reaction heat absorbed may be controlled by controlling the concentration of nitric acid employed, and by control of the quantity of acid added at each step, that is, by varying the mole ratios of alkane to acid at the time and place of injection within the high effective mole ratios described. Further minor control may be effected by slight additions of heat, particularly in the vaporization zones, and slight cooling, if necessary, in the reaction zones. The heat may be supplied by any convenient method, such as by the strip heaters shown or by other suitable means. Cooling can be effected, for example, by the introduction of cooling medium which may be cold gaseous alkane, or an inert gas or even an inert liquid such as water.

The major control, as brought out above, is effected by the step-wise addition of the liquid reactant to regulate the magnitude of reaction taking place in any desired period of time, and consequently limiting the rate of generation of the exothermic heat of reaction. External heating and cooling will usually be used to effect minor temperature regulations, aimed at maintaining the temperature within the range most favorable for obtaining the particular desired reaction products.

This step-wise addition of acid also permits the utilization of the high effective mole ratios of alkane to nitric acid at the points of reaction described, while still maintaining the overall mole ratio of reactants fed through the system at or near the low prior ratios, as described.

In the nitration of propane, for example, with 75% nitric acid, under the conditions described, the heat of exothermic reaction is of the same order, but slightly less than the heat of vaporization of the acid. In this reaction, of the total nitric acid fed to the reactor, about 37% on a mole basis is converted to nitroalkanes, about 57% is reduced to nitric oxide, the remainder being lost, mostly as acid in the water formed in the reaction. A number of reaction schemes in a system including lower alkanes and nitric acid are possible among which the following are illustrative:

(1) $C_2H_6 + HNO_3 = C_2H_5NO_2 + H_2O$
(2) $3C_3H_8 + 4HNO_3 = 3CH_3COCH_3$ (or $CH_3CH_2CHO) + 4NO + 5H_2O$
(3) $3C_3H_8 + 10HNO_3 = 3CH_3CHO + 3CO_2 + 10NO + 11H_2O$
(4) $3C_3H_8 + 20HNO_3 = 9CO_2 + 20NO + 22H_2O$
(5) $3C_3H_8 + 14HNO_3 = 9CO + 14NO + 19H_2O$
(6) $4HNO_3 = 2H_2O + 4H_2O + 3O_2$

Regardless of which particular reactions take place, the total heat generated will be approximately the same provided the reduction product of nitric acid is nitric oxide, and this is the case in the vapor phase nitration of alkanes, so that as a practical matter it is not necessary to determine just what reactions are taking place and in practice, results approximate the theoretical heat released per unit mole of nitric acid or somewhat higher and this value is approximately the same for all the lower alkanes.

In practice the acid used need not be 100% acid, as not only is this extremely difficult to handle, but yields of nitroalkanes appear to be more nearly optimum when the nitric acid contains certain proportions of water ranging from approximately 5–55%. However, greater utilization of heat of reaction is possible if the acid to be vaporized is of a relatively high concentration. Thus, although the heat of reaction of nitric acid per se with nitroalkanes is the same regardless of the concentration, that is, if based only on the nitric acid content of the solution used, the heat required to vaporize the acid solution and raise it to reaction temperature, on the other hand, against which the heat of reaction must be balanced will depend both on the concentration of acid used, and on its initial temperature. The more concentrated the acid the greater the advantages that can be realized for this particular reaction. For example, the percent of the total required heat which can be supplied by the heat of reaction of 45% acid at 20° C., is about 43% at the mole ratios indicated. If 62% acid is used, about 64% of the necessary heat can be furnished by the heat of reaction. Using 75–78% acid the heat efficiencies are even more favorable and substantially all of the necessary heat can be furnished by the reaction. Above this concentration, the heat of reaction begins to exceed that required to vaporize and heat the acid, so that above about 80% concentrations cooling of some kind becomes necessary. Therefore, the preferable concentrations of nitric acid to be used is in the range between about 70 and 80%.

The temperature range over which alkanes can be nitrated with nitric acid in the vapor phase to nitroalkanes varies over a range between about 360° C. and 480° C. But best yields of nitroalkanes with a minimum of undesired decomposition products and side reaction products are obtained only when the temperatures are maintained between about 390–440° C. The reaction takes place extremely rapidly requiring only a small fraction of a second at about 430° C.

In practicing our invention, we can maintain the temperature within the favorable range and prevent it from reaching high temperatures at which side reactions occur and decomposition sets in. In our process and apparatus, the reacting gases are propelled continuously through the reaction units under a positive pressure. The nitric acid added at any single point is limited in quantity in accordance with the indicated balance at any concentration between heat of reaction and vaporization respectively so that the evolved heat is sufficient only to raise the temperature of the reaction mixture to the upper limit of favorable reaction conditions, namely, about 440° C. Before it exceeds this temperature, additional acid is introduced in sufficient quantity to absorb a quantity of heat in vaporizing to lower the temperature of the mixture to the lower limit of favorable reaction, about 390° C., but not below. Slight variations can be adjusted as described by heating the vaporization portions and cooling the reaction portions. The number of successive additions of acid depend on the heat balance and mole ratio factors described above, which in turn depends to some extent on the acid concentration. Using 75% nitric acid, about 5 additions of acid are suitable to utilize the heat of reaction to advantage and to react with the desired proportion of the propane fed to the system to yield maximum conversions.

Best yields of nitroalkanes are obtained when the overall mole ratio of alkane to nitric acid is above about 4 to 1, the higher ratios producing higher yields but entailing the expense of recovering large proportions of unreacted alkane. However, in regulating our reaction temperatures as described, the effective mole ratios at any particular instant are maintained at a considerably higher figure, while still maintaining the overall mole ratio low enough to keep down the volume of alkane to be recovered to an economically low figure. Thus, with an overall mole ratio of about 5 to 1, and using 5 successive additions of nitric acid of 78% concentration our initial mole ratio, that is, the mole ratio at the first nitric acid addition may be as high as 25 to 1 while the mole ratios at the successive addition points will be of the order of 24 to 1, 23 to 1, 22 to 1, and 21 to 1, respectively, depending on the quantity of alkane which has reacted in the earlier stages.

Our invention is further illustrated by the following specific examples.

*Example I*

Propane was preheated to 430–435° C. and fed at the rate of 11,500 cu. ft. per hour and 125 pound gauge pressure to the top of the first spray vaporizer-reactor section. The complete reaction chamber consisted of five spray vaporizer-reactor sections. Each vaporizer-reactor unit was 6 feet long by 3 inches diameter. For 30 inches below each atomizing nozzle the stainless steel reactor wall was protected by a fused silica liner. Cold 78.0% nitric acid, at atmospheric temperature (15–25° C.) was pumped to each nozzle at the rate of 107 pound per hour. Initial mole ratio of propane to $HNO_3$ was 24.2 to 1, overall ratio for entire nitrator was 4.84 to 1.

The temperature in the center of each vaporizer-reactor section, where the acid spray was completely vaporized but reaction was just starting, was 400–410° C. The temperature at the exit end of each vaporization-reaction section was held at approximately 425° C. The nitrator was well insulated to reduce heat loss to a minimum. With 78.0% $HNO_3$, the heat of vaporization of the acid plus losses, was slightly less than the heat of reaction, so that there was a tendency for the temperature to increase a few degrees as the reactants proceeded from the top to bottom of the reactor. To maintain steady temperatures throughout the reactor, that is, to hold the exit end of each vaporization-reaction section at approximately 425° C., a small amount of steam (175° C.) was introduced to those sections which tended to operate at higher than desired temperatures to cool these units. The main control of temperature depended on the temperature of the preheated propane and the concentration of the nitric acid. Steam was used only for fine control.

The nitroparaffins were separated from the condensate, and 169 pound per hour of average molecular weight 83 were obtained. This amounted to a 30.8% conversion of the nitric acid into nitroparaffins.

*Example II*

The same spray vaporizer-reactor and essentially the same conditions were used as in the previous example except that 76% nitric acid was used. With acid of this strength the heat needed to vaporize the acid and heat the acid vapors up to reaction temperatures plus the heat needed to replace heat losses, losses being kept to a minimum by four inches of insulation on the nitrator, exceeded the heat supplied by heat of reaction. Consequently, in order to maintain the same reaction conditions in each of the vaporization-reaction sections and to prevent temperature drops at corresponding points from the inlet to the outlet of the nitrator, heat was supplied to the unit. Electrical strip heaters were placed on the walls of the vaporizer-reactor, through which about 2,000 watts were supplied to each vaporization-reaction unit. To supply all the heat necessary to vaporize and preheat the acid would have required about 22,500 watts. Therefore, with nitric acid at a concentration as low as 76% as in the present example the heat of reaction supplied the major proportion of the heat required for the vaporization of the acid and for heating it to reaction temperature, that is, over 90%. The temperature of the exit gases was between 425 and 430° C.

*Example III*

This run was made under conditions similar to those of Example I, except that a lower mole ratio of propane to nitric acid was used. The propane was preheated to about 435° C. and introduced into the nitrator at 11,500 cu. ft. per hour and 125 lb. pressure. The nitric acid was introduced through five spray jets at the rate of 122 lb. of 77.2% acid per hour. This corresponds to an initial mole ratio of propane to HNO₃ of 21.5 to 1 and an overall mole ratio 4.30 to 1.

The temperature at the center of each vaporizer-reactor section was about 400° C. The temperature at the exit end of each vaporization-reaction section, where the reaction was complete and the reactant gases, cooled during the vaporization of the acid, had been reheated by the heat of reaction, held at 416–420° C.

During this run the balance between heat of vaporization and heat of reaction was nearly perfect. The slight excess of heat of reaction was taken care of by introducing a very small amount of steam to the nitrator at those sections where the temperatures were a little higher than desired.

The nitroparaffins were produced at the rate 185 lb. per hour which corresponds to a conversion of 29.9% of the nitric acid to nitroparaffins.

*Example IV*

This run was similar to the preceding run, except that the nitrator consisted of four spray vaporizer-reactor sections instead of five. The same propane rate and temperature were used. Approximately the same amount of acid was supplied to the individual spray jets, but the overall ratio of propane to nitric acid for the entire nitrator was considerably higher. The total acid rate for the four jets was 461 lb. per hour of 77.5% acid which corresponds to an overall mole ratio of propane to acid of 5.65 to 1. The ratio at the first jet was 22.6 to 1.

Steam was added to prevent the slight excess of heat of reaction from causing a temperature rise. The temperature at the center of each vaporizer-reactor section was about 400° C. The exit end of each vaporization-reaction section was 415–420° C.

The nitroparaffins were produced at the rate of 139 lb. per hour which amounts to a 29.5% conversion of nitric acid to nitroparaffins.

*Example V*

This run differed from the others in that in previous runs the propane flowed from the top to the bottom of the nitrator and the acid spray jets were directed downward so that the two streams flowed in the same direction. For this run the jets were left unchanged but the propane flow was reversed so that in this run a mist of nitric acid was sprayed out against the stream of propane rather than concurrent with it.

The nitrator consisted of four spray vaporizer-reactor sections as it had in Example IV and similar acid and propane rates were used. Propane, preheated to about 440° C., was introduced to the bottom of the nitrator at the rate of 11,500 cu. ft. per hour. The acid rate was 442 lb. per hour for the four jets. The average acid concentration was 77.3% so that the overall mole rate of propane to acid was 5.9 to 1. That at the first jet was 23.6 to 1.

Exit temperatures from the vaporization-reaction sections were 415–420° C. A 29.6% conversion of nitric acid to nitroparaffins was obtained.

While the above describes the preferred embodiments of our invention, it will be understood that departures may be made therefrom within the scope of the specification and claims.

What is claimed is:

1. A continuous process of manufacturing lower nitroalkanes which comprises heating a low-molecular alkane to a temperature within the range of about 390° to 440° C., continuously passing the heated alkane in vapor form into one end of an elongated reaction zone, introducing concentrated liquid nitric acid in a finely divided state into said reaction zone in contact with the heated alkane and in amount sufficient to cool said alkane below its preheated temperature but not below 390° C., said concentrated nitric acid containing sufficient water to raise its heat of vaporization under the conditions of the process to the point at which said heat substantially balances the heat of the nitration reaction, whereby an exothermic reaction takes place tending temporarily to heat the reaction mixture above said temperature range as said mixture passes along said reaction zone, then before said temperature range has been exceeded contacting the reaction mixture with additional finely-divided nitric acid of said concentration to again cool said mixture, and continuing said procedure until the successive additions of nitric acid have raised the over-all ratio of nitric acid to alkane to within the range of about 1:3 to 1:6, and withdrawing the resulting reaction products from the opposite end of said reaction zone.

2. The process of claim 1 wherein the concentration of nitric acid added is within the range of about 70 to 80 per cent by weight.

3. The process of claim 1, wherein the nitric acid is introduced at a sufficient number of points in said reaction zone to produce a ratio of nitric acid to unreacted alkane, measured at any point in said zone, which is within the range of about 1:10 to 1:40.

4. The process of claim 1 wherein the reaction mixture is cooled slightly at the points at which the nitric acid is reacting with the alkane by the introduction of an inert cooling fluid into the reaction zone.

5. The process of claim 1 wherein said reaction zone is heated slightly at the points at which the acid is being vaporized.

6. The process of claim 1 wherein said alkane is methane.

7. The process of claim 1 wherein said alkane is ethane.

8. The process of claim 1 wherein said alkane is propane.

9. The process of claim 1 wherein the reaction zone is vertical and the alkane is introduced at the top of said zone.

10. The process of claim 1 wherein said reaction zone is vertical and the alkane is introduced at the bottom of said zone.

11. A continuous process of manufacturing nitropropanes which comprises heating propane to a temperature within the range of about 390° to 440° C., continuously passing the heated propane in vapor form into one end of an elongated reaction zone, introducing concentrated liquid nitric acid in a finely divided state into said reaction zone in contact with the heated propane and in amount sufficient to cool said alkane below its preheated temperature but not below 390° C., said concentrated nitric acid containing sufficient water to raise its heat of vaporization under the conditions of the process to the point at which said heat substantially balances the heat of the nitration reaction, whereby an exothermic reaction takes place tending temporarily to heat the reaction mixture above said temperature range as said mixture passes along said reaction zone, then before said temperature range has been exceeded contacting the reaction mixture with additional finely-divided nitric acid of said concentration to again cool said mixture, and continuing said procedure until the successive additions of nitric acid have raised the over-all ratio of nitric acid to propane to within the range of about 1:3 to 1:6, and withdrawing the resulting nitropropane from the opposite end of said reaction zone.

12. The process of claim 11 wherein the nitric acid is introduced at a sufficient number of points in said reaction zone to produce a ratio of nitric acid to unreacted alkane, measured at any point in said zone, which is within the range of about 1:20 to 1:30.

13. A continuous process of manufacturing lower nitro-alkanes which comprises preheating a low-molecular alkane to a temperature within the range of about 390° to 440° C., continuously passing the heated alkane in vapor form into one end of an elongated reaction zone, spraying liquid nitric acid having a concentration ranging from about 70 to 80 per cent by weight into said reaction zone in contact with the heated alkane and in amount sufficient to cool said alkane below its preheated temperature but not below 390° C., whereby an exothermic reaction takes place tending to heat the mixture above said temperature range as the unreacted alkane and reaction products pass along said reaction zone, contacting the latter with another spray of nitric acid of said concentration at a point before the temperature exceeds said range to again cool the unreacted alkane and reaction products below 440° C. but not below 390° C., whereby another rise in temperature is produced, and continuing said procedure until the successive additions of nitric acid raise the over-all ratio of nitric acid to alkane to within the range of about 1:3 to 1:6, the nitric acid being introduced at a sufficient number of points in said reaction zone to produce a ratio of nitric acid to unreacted alkane, measured at any point in said zone, which is within the range of about 1:10 to 1:40, and withdrawing the resulting reaction products from the opposite end of said reaction zone.

LEONARD A. STENGEL.
RICHARD S. EGLY.

REFERENCES CITED

The following references are of record in the file of this patent:

UNITED STATES PATENTS

| Number | Name | Date |
| --- | --- | --- |
| 2,153,065 | Martin | Apr. 4, 1939 |
| 2,004,072 | Hass | June 4, 1935 |
| 1,224,485 | Mesereau | May 1, 1917 |
| 1,955,873 | Deanesley | Apr. 24, 1934 |
| 2,368,733 | Watson | Feb. 6, 1945 |
| 2,353,832 | Kemp | July 18, 1944 |
| 2,161,974 | Peck | June 13, 1939 |
| 2,363,834 | Crater | Nov. 28, 1944 |

FOREIGN PATENTS

| Number | Country | Date |
| --- | --- | --- |
| 124,461 | British | Apr. 3, 1919 |